(12) United States Patent
Kumai

(10) Patent No.: US 10,866,349 B2
(45) Date of Patent: Dec. 15, 2020

(54) WIRE GRID POLARIZATION ELEMENT AND ELECTRONIC DEVICE

(71) Applicant: SEIKO EPSON CORPORATION, Tokyo (JP)

(72) Inventor: Yoshitomo Kumai, Okaya (JP)

(73) Assignee: SEIKO EPSON CORPORATION, Tokyo (JP)

( * ) Notice: Subject to any disclaimer, the term of this patent is extended or adjusted under 35 U.S.C. 154(b) by 101 days.

(21) Appl. No.: 16/229,552

(22) Filed: Dec. 21, 2018

(65) Prior Publication Data

US 2019/0196080 A1 Jun. 27, 2019

(30) Foreign Application Priority Data

Dec. 26, 2017 (JP) ................. 2017-248836

(51) Int. Cl.
*G02B 5/30* (2006.01)
*G02F 1/1335* (2006.01)

(52) U.S. Cl.
CPC ..... *G02B 5/3058* (2013.01); *G02F 1/133528* (2013.01); *G02F 2001/133548* (2013.01)

(58) Field of Classification Search
CPC ........ G02B 1/04; G02B 5/3033; G02B 1/105; G02B 1/14; G02B 5/3083; G02B 5/30; G02B 5/3025; G02B 1/111; G02B 5/3041; G02B 27/283; G02B 27/286; G02B 5/3016; G02B 5/305; G02B 1/02; G02B 1/043; G02B 5/02; G02B 5/0278; G02B 5/3058; G02B 1/10; G02B 2027/0112; G02B 21/14; G02B 27/0006; G02B 27/0101; G02B 27/0172; G02B 5/0221; G02B 5/0242; G02B 5/208; G02B 5/32; G02B 19/0028; G02B 19/0057; G02B 1/007; G02B 1/08; G02B 1/11; G02B 1/118; G02B 1/12; G02B 1/16; G02B 1/18; G02B 2027/011; G02B 2027/012; G02B 2027/0125; G02B 2027/0138; G02B 2027/0174; G02B 2027/0178; G02B 21/0032; G02B 2207/101; G02B 23/08; G02B 23/105;
(Continued)

(56) References Cited

U.S. PATENT DOCUMENTS 6,122,103 A 9/2000 Perkins et al.
2012/0105745 A1 5/2012 Kumai

FOREIGN PATENT DOCUMENTS

JP 2003-502708 A 1/2003
JP 2012-27221 A 2/2012
JP 2012-098469 A 5/2012

*Primary Examiner* — Collin X Beatty
*Assistant Examiner* — Grant A Gagnon
(74) *Attorney, Agent, or Firm* — Oliff PLC

(57) ABSTRACT

A wire grid polarization element includes a wire grid including a plurality of wire-shaped metal layers arranged in parallel on one surface of a substrate, and a light-absorbing layer including a germanium film containing at least one of oxygen and nitrogen is provided on a side opposite to the substrate with respect to the plurality of wire-shaped metal layers. Such a germanium film can be formed by mixing an oxygen gas or a nitrogen gas into an argon gas in film formation by reactive sputtering. In this case, a flow rate of the oxygen gas or the nitrogen gas is made appropriate and thus, a complex refraction index of the germanium film is set to an appropriate value, and a reflectance with respect to linearly polarized light vibrating in an extending direction of the wire-shaped metal layers is set to 3.0% or lower.

8 Claims, 9 Drawing Sheets

(58) Field of Classification Search
CPC .. G02B 26/123; G02B 27/0081; G02B 27/01; G02B 27/0103; G02B 27/0905; G02B 27/0927; G02B 27/0944; G02B 27/0988; G02B 27/1046; G02B 27/14; G02B 27/142; G02B 27/145; G02B 27/28; G02B 27/281; G02B 27/285; G02B 27/48; G02B 27/52; G02B 27/58; G02B 30/25; G02B 30/27; G02B 3/00; G02B 3/005; G02B 5/008; G02B 5/0215; G02B 5/0284; G02B 5/04; G02B 5/045; G02B 5/223; G02B 5/3008; G02B 5/3075; G02B 6/00; G02B 6/0053; G02B 6/0065; G02B 6/1226; G02B 6/2726; G02B 6/2793; G02B 6/29397; G02B 6/32; G02B 6/4203; G02B 6/4206; G02B 6/4208; G02B 6/4275; G02B 6/4296; G02F 1/133528; G02F 2201/50; G02F 2202/28; G02F 1/133634; G02F 2001/133607; G02F 2202/40; G02F 1/133308; G02F 1/13363; G02F 2001/133311; G02F 2001/133531; G02F 2001/133635; G02F 2413/11; G02F 2413/12; G02F 1/0136; G02F 1/0147; G02F 1/1303; G02F 1/133305; G02F 1/133502; G02F 1/133504; G02F 1/133526; G02F 1/133533; G02F 1/133536; G02F 1/133608; G02F 1/13362; G02F 1/134363; G02F 1/13439; G02F 1/1393; G02F 1/1396; G02F 2001/133302; G02F 2001/13332; G02F 2001/133325; G02F 2001/133331; G02F 2001/133357; G02F 2001/133507; G02F 2001/133541; G02F 2001/133548; G02F 2001/133637; G02F 2202/023; G02F 2202/025; G02F 2202/22; G02F 2413/03; G02F 2413/04; G02F 2413/08; G02F 2413/105
USPC .......................................................... 359/485
See application file for complete search history.

WIRE GRID POLARIZATION ELEMENT AND ELECTRONIC DEVICE

BACKGROUND

1. Technical Field

The invention relates to a wire grid polarization element including a wire grid including a plurality of wire-shaped metal layers arranged in parallel and extending and an electronic device.

2. Related Art

In a wire grid polarization element, a plurality of wire-shaped metal layers is arranged in parallel on one surface of a transmissive substrate, primary linearly polarized light (P polarized light) vibrating in a direction perpendicular to an extending direction of the wire-shaped metal layers is transmitted, and transmission of secondary linearly polarized light (S polarized light) vibrating in the extending direction of the wire-shaped metal layers is inhibited. Such a wire grid polarization element constitutes an electrooptical device such as a liquid crystal panel, and an optical modulation unit in a projection-type display apparatus. Here, in a case where a reflectance exhibited when the secondary linearly polarized light is incident on the wire grid polarization element is high, reflected light is incident on the electrooptical device, and causes life shortening due to temperature rise of the electrooptical device, occurrence of scroll noise, occurrence of ghost due to stray light, and the like. Thus, it is conceivable to provide a light-absorbing layer including a germanium film on an side opposite to the substrate with respect to the plurality of wire-shaped metal layers (see JP-A-2012-98469).

However, although there is a demand for further reduction of a reflectance exhibited when the secondary linearly polarized light is incident on the wire grid polarization element, it is difficult to respond to such a demand with the light-absorbing layer including pure germanium.

SUMMARY

An advantage of some aspects of the invention is to provide a wire grid polarization element capable of reducing a reflectance with respect to linearly polarized light vibrating in an extending direction of wire-shaped metal layers, a manufacturing method of a wire grid polarization element, and an electronic device.

To achieve the above-described advantage, according to an aspect of the invention, in a wire grid polarization element including a wire grid including a plurality of wire-shaped metal layers arranged in parallel on one surface of a substrate, a light-absorbing layer including a germanium film containing at least one of oxygen and nitrogen is provided on an side opposite to the substrate with respect to the plurality of wire-shaped metal layers. Thus, it is possible to reduce the reflectance with respect to the linearly polarized light vibrating in the extending direction of the wire-shaped metal layers, as compared with the case of a light-absorbing layer including pure germanium.

In a case where a complex refraction index N of a material constituting the light-absorbing layer is expressed by the following formula, $$N = n + i \cdot k$$

n=refractive index
k=extinction coefficient, in a typical wavelength of 550 nm, the refractive index n and the extinction coefficient k of pure germanium satisfy the following condition (n,k)=(4.9,2.0). In contrast, it is found that in a case where the refractive index n and the extinction coefficient k satisfy the following appropriate conditions (n,k)=(5,1)
(n,k)=(4,1)
(n,k)=(3,1), a reflectance of visible light of the wire grid polarization element can significantly reduce. Additionally, it is found that in a case where at least one of oxygen and nitrogen is appropriately incorporated in germanium, the refractive index n and the extinction coefficient k satisfy the above-described appropriate conditions. Based on such findings, according to an aspect of the invention, since the germanium film containing at least one of oxygen and nitrogen is used as the light-absorbing layer, it is possible to reduce a reflectance.

In the wire grid polarization element according to an aspect of the invention, it is possible to adopt an aspect in which the wire grid has a reflectance equal to or lower than 3.0% with respect to linearly polarized light vibrating in an extending direction of the plurality of wire-shaped metal layers. According to an aspect of the invention, the reflectance with respect to the linearly polarized light vibrating in the extending direction of the wire-shaped metal layers is equal to or lower than 3.0%, and it is possible to significantly reduce the reflectance as compared with the case of using pure germanium in the light-absorbing layer.

In the wire grid polarization element according to an aspect of the invention, it is possible to adopt an aspect in which the light-absorbing layer includes composition more germanium-rich than germanium dioxide including stoichiometric composition of germanium and oxygen, and more germanium-rich than trigermanium tetranitride including stoichiometric composition of germanium and nitrogen. For example, in the wire grid polarization element according to an aspect of the invention, it is possible to adopt an aspect in which the light-absorbing layer includes germanium oxide containing germanium and oxygen, and a composition ratio of the germanium and the oxygen is 1:0.64 to 1.68.

According to another aspect of the invention, in a manufacturing method of a wire grid polarization element including a wire grid including a plurality of wire-shaped metal layers arranged in parallel on one surface of a substrate, a light-absorbing layer including a germanium film containing at least one of oxygen and nitrogen is provided on an side opposite to the substrate with respect to the plurality of wire-shaped metal layers by a reactive sputtering method in an atmosphere containing at least one of oxygen and nitrogen.

According to an aspect of the invention, since the reactive sputtering method is used in forming the germanium film containing at least one of oxygen and nitrogen, it is possible to easily control an oxygen content or a nitrogen content in germanium constituting the light-absorbing layer by controlling a flow rate of an oxygen gas or a nitrogen gas, and it is possible to easily control the refractive index n and the extinction coefficient k. Accordingly, it is possible to constitute the light-absorbing layer having the refractive index n and the extinction coefficient k satisfying the above-described appropriate conditions.

According to still another aspect of the invention, in an electronic device including a first optical modulation unit including a first wire grid polarization element including a wire grid including a plurality of wire-shaped metal layers arranged in parallel on one surface of a substrate, and an electrooptical device, and configured to receive a first light beam of a first wavelength region, and a second optical modulation unit including a second wire grid polarization element including a wire grid including a plurality of wire-shaped metal layers arranged in parallel on one surface of a substrate, and an electrooptical device, and configured to receive a second light beam of a wavelength longer than the first wavelength region, in each of the first wire grid polarization element and the second wire grid polarization element, a light-absorbing layer including a germanium film containing at least one of oxygen and nitrogen is provided on an side opposite to the substrate with respect to the plurality of wire-shaped metal layers.

According to an aspect of the invention, in each of the first wire grid polarization element and the second wire grid polarization element, the light-absorbing layer including the germanium film containing at least one of oxygen and nitrogen is provided, and thus it is possible to reduce a reflectance of each of the first wire grid polarization element and the second wire grid polarization element. Accordingly, in each of the first optical modulation unit and the second optical modulation unit, it is possible to suppress light reflected by the wire grid polarization element and to be incident on the electrooptical device. Therefore, it is possible to suppress occurrence of life shortening due to temperature rise of the electrooptical device, and occurrence of scroll noise, ghost due to stray light, and the like.

In the electronic device according to an aspect of the invention, it is possible to adopt an aspect in which an oxygen content and a nitrogen content in the light-absorbing layer of the first wire grid polarization element are larger than an oxygen content and a nitrogen content in the light-absorbing layer of the second wire grid polarization element. Since the first wire grid polarization element and the second wire grid polarization element are wavelength dispersive, the oxygen content or the nitrogen content in germanium used in the light-absorbing layer is made appropriate corresponding to a wavelength of incident light. Accordingly, in each of the first wire grid polarization element and the second wire grid polarization element on which light of different wavelength regions is incident, it is possible to reduce a reflectance. Therefore, it is possible to suppress light reflected by each of the first wire grid polarization element and the second wire grid polarization element and to be incident on the electrooptical device.

In the electronic device according to an aspect of the invention, it is possible to adopt an aspect in which the first wire grid polarization element has a reflectance equal to or lower than 3.0% with respect to linearly polarized light of the first light beam vibrating in an extending direction of the plurality of wire-shaped metal layers, and the second wire grid polarization element has a reflectance equal to or lower than 3.0% with respect to linearly polarized light of the second light beam vibrating in an extending direction of the plurality of wire-shaped metal layers. According to such an aspect, it is possible to further suppress light reflected by the first wire grid polarization element and the second wire grid polarization element and to be incident on the electrooptical device.

In the electronic device according to an aspect of the invention, it is possible to adopt an aspect in which the first light beam is green light and the second light beam is red light. Although reduction of a reflectance of the green light or the red light at the wire grid polarization element is more difficult than reduction of a reflectance of blue light at the wire grid polarization element, it is possible to reduce the reflectance of the green light and the reflectance of the red light according to an aspect of the invention.

BRIEF DESCRIPTION OF THE DRAWINGS

The invention will be described with reference to the accompanying drawings, wherein like numbers reference like elements.

Figure 2:
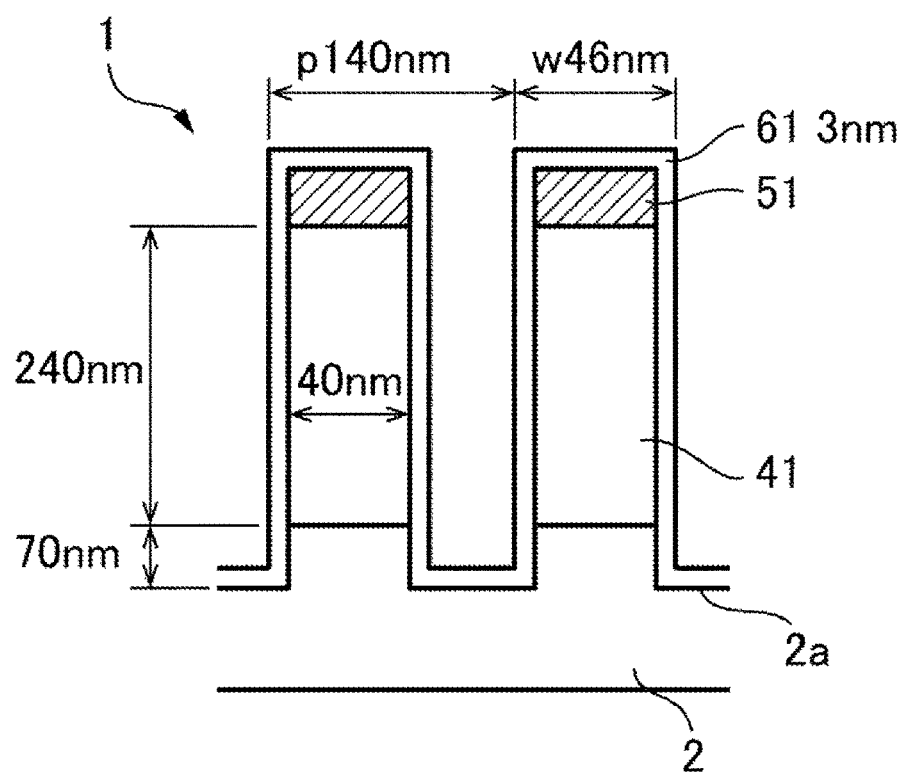
FIG. 2 is a cross-sectional view of the wire grid polarization element illustrated in FIG. 1.

Each of FIGS. 3A to 3D is a graph showing a relation between a wavelength and polarization characteristics in a case where a complex refraction index of a material constituting a light-absorbing layer illustrated in FIG. 2 is changed.

Figure 4A:
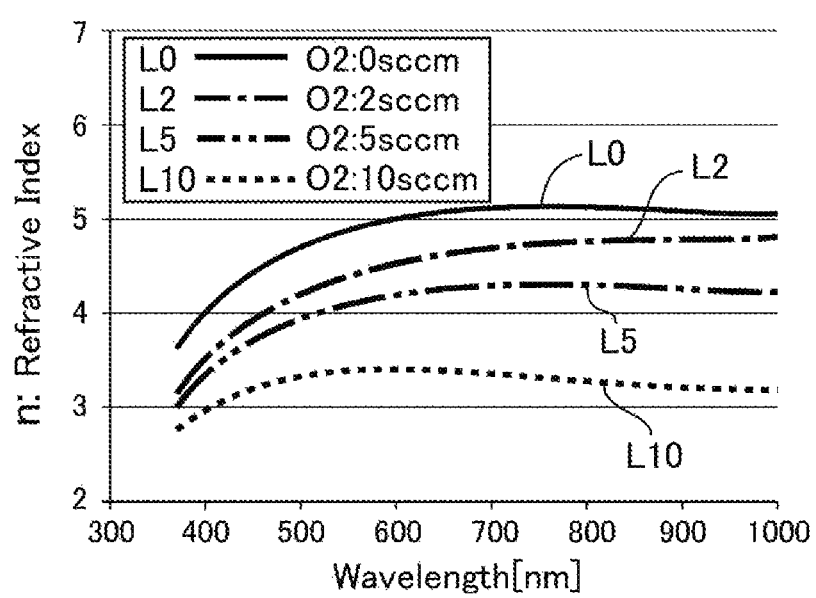
Figure 4B:
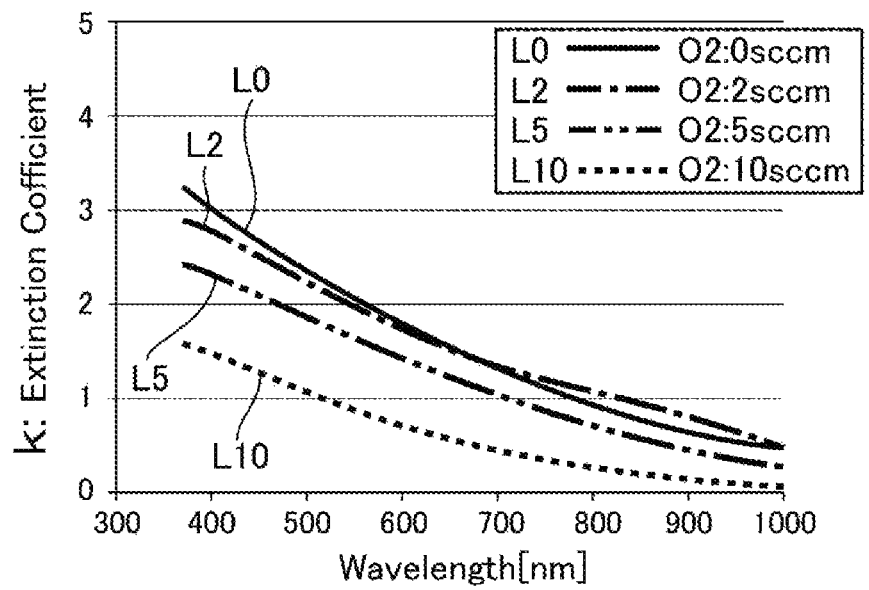

Each of FIGS. 4A and 4B is a graph showing a relation between a wavelength and a complex refraction index in a case where a condition (an oxygen gas flow rate) for film formation of a germanium film by a reactive sputtering method is changed.

Figure 5:
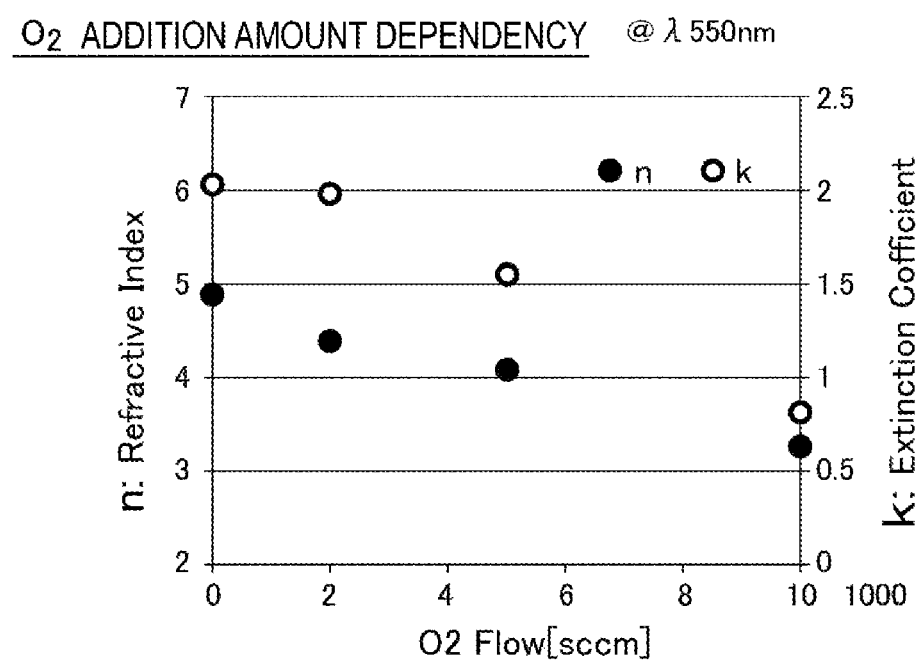

FIG. 5 is a graph showing a relation between an oxygen gas flow rate in film formation of a germanium film and a complex refraction index of the germanium film with respect to light having a wavelength of 550 nm.

Figure 6A:
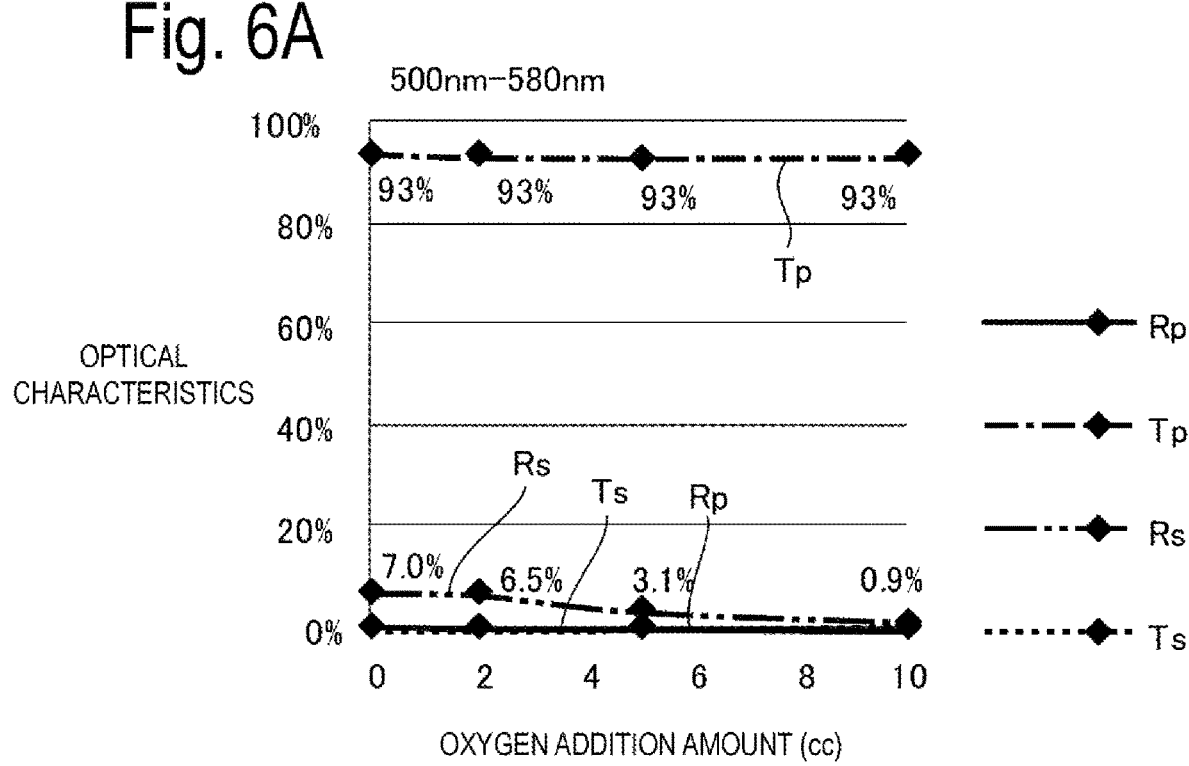
Figure 6B:
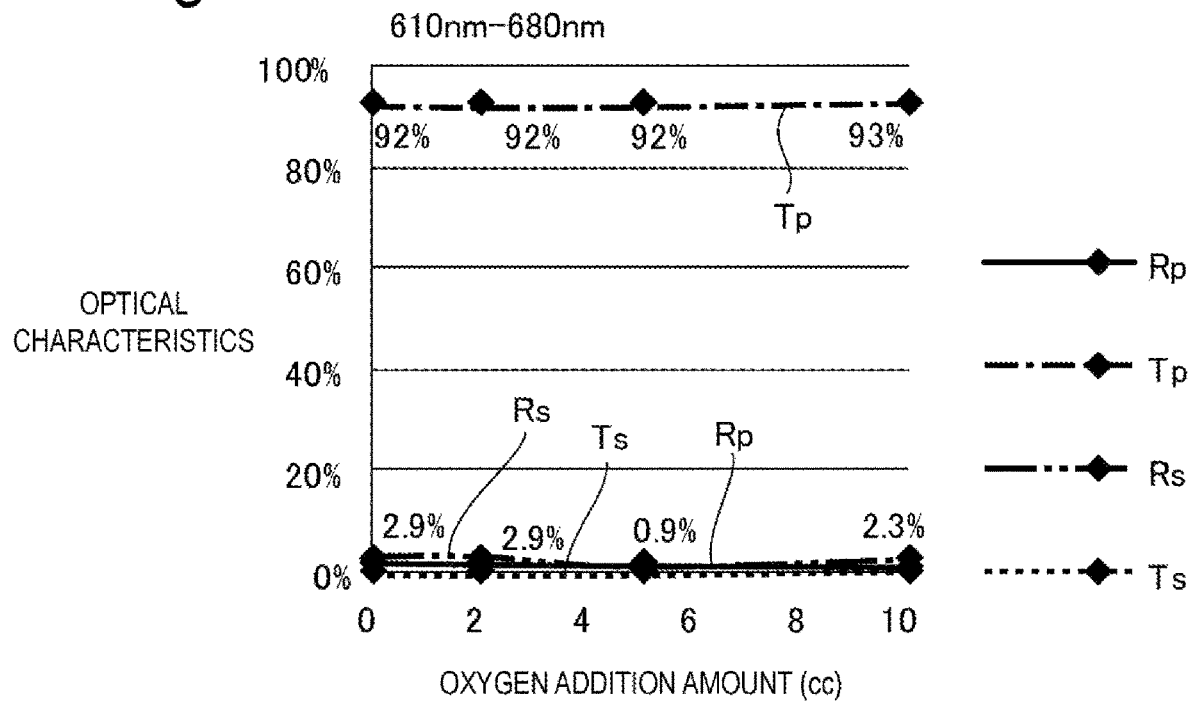

Each of FIGS. 6A and 6B is a graph showing a change in a reflectance and the like in a case where an oxygen gas flow rate in film formation of a germanium film by a reactive sputtering method is changed.

Figure 7A:
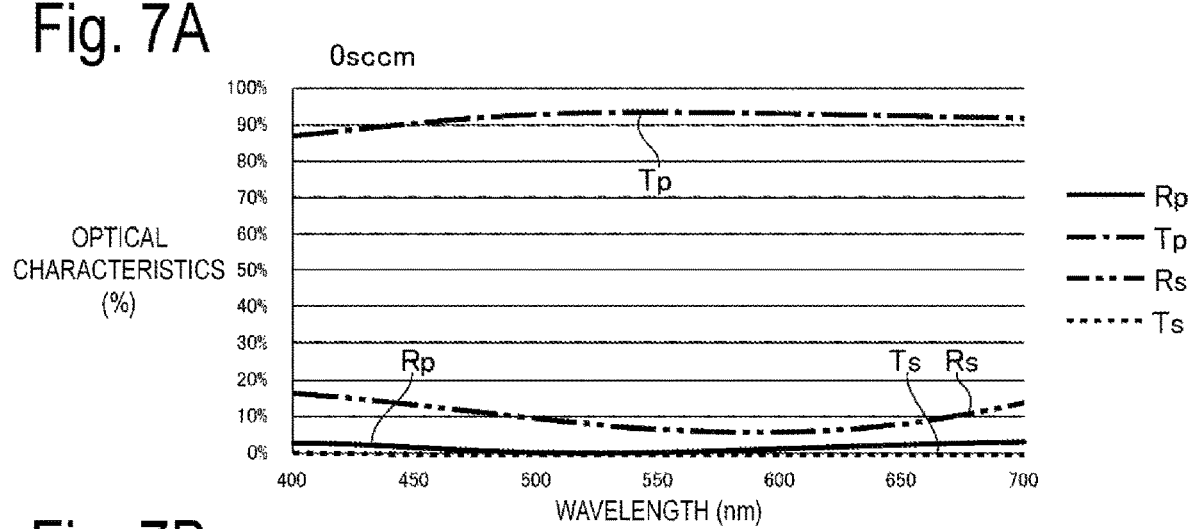
Figure 7B:
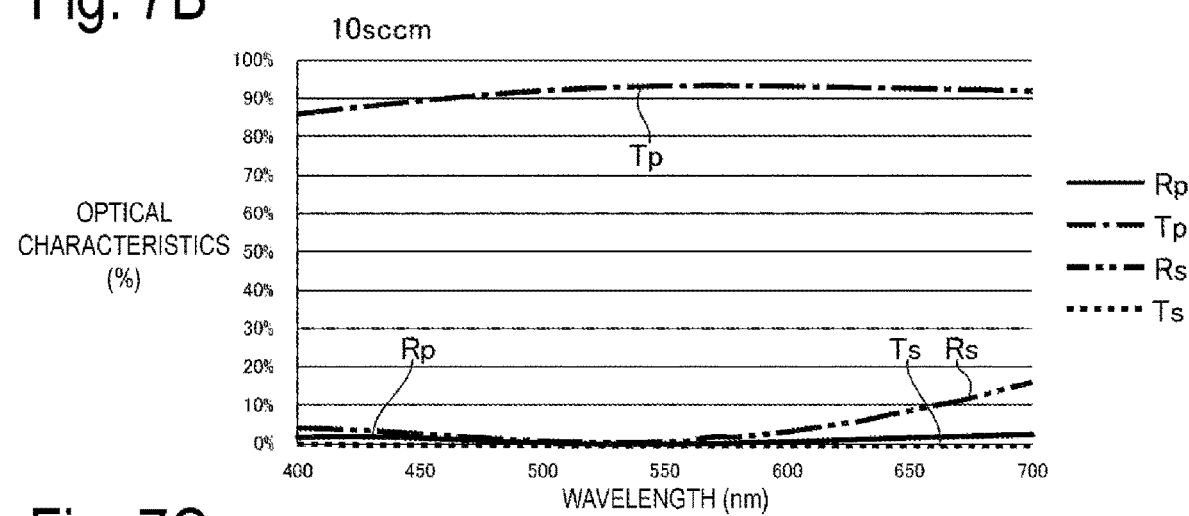
Figure 7C:
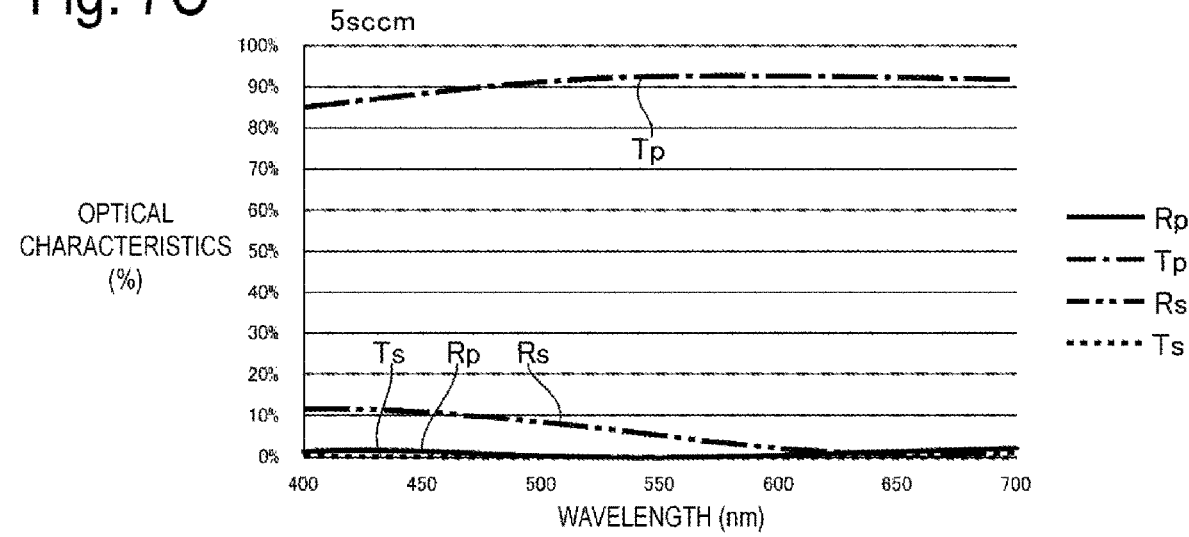

FIGS. 7A to 7C are graphs showing in comparison polarization characteristics of wire grid polarization elements manufactured by changing and setting an oxygen gas flow rate.

Figure 8A:
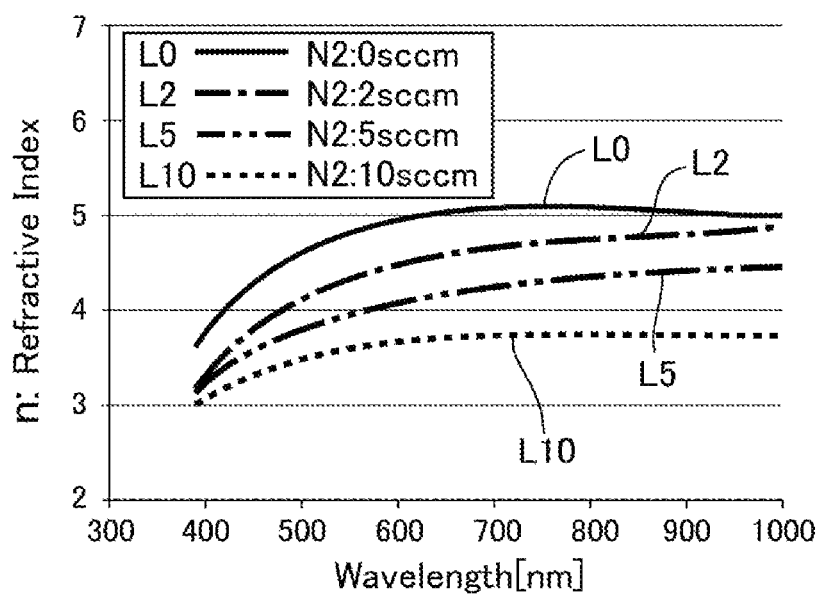
Figure 8B:
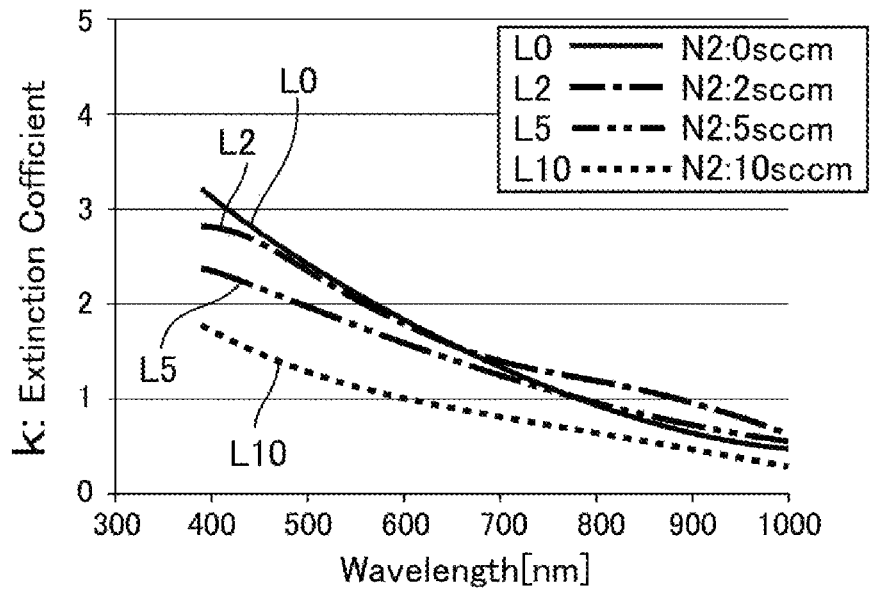

Each of FIGS. 8A and 8B is a graph showing a relation between a wavelength and a complex refraction index in a case where a condition (a nitrogen gas flow rate) for film formation of a germanium film by a reactive sputtering method is changed.

Figure 9:
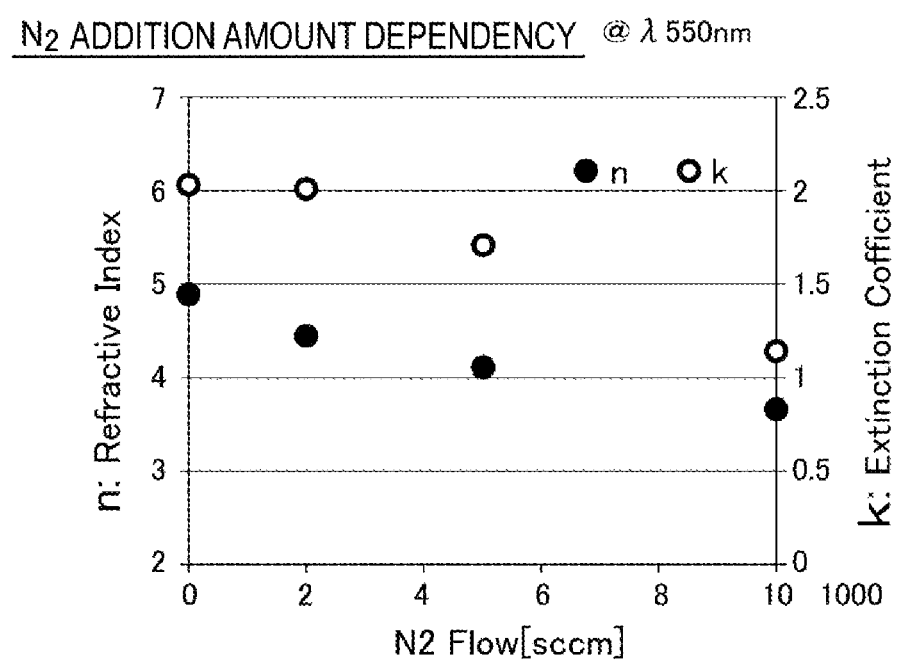

FIG. 9 is a graph showing a relation between a nitrogen gas flow rate in film formation of a germanium film and a complex refraction index of the germanium film with respect to light having a wavelength of 550 nm.

Figure 10:
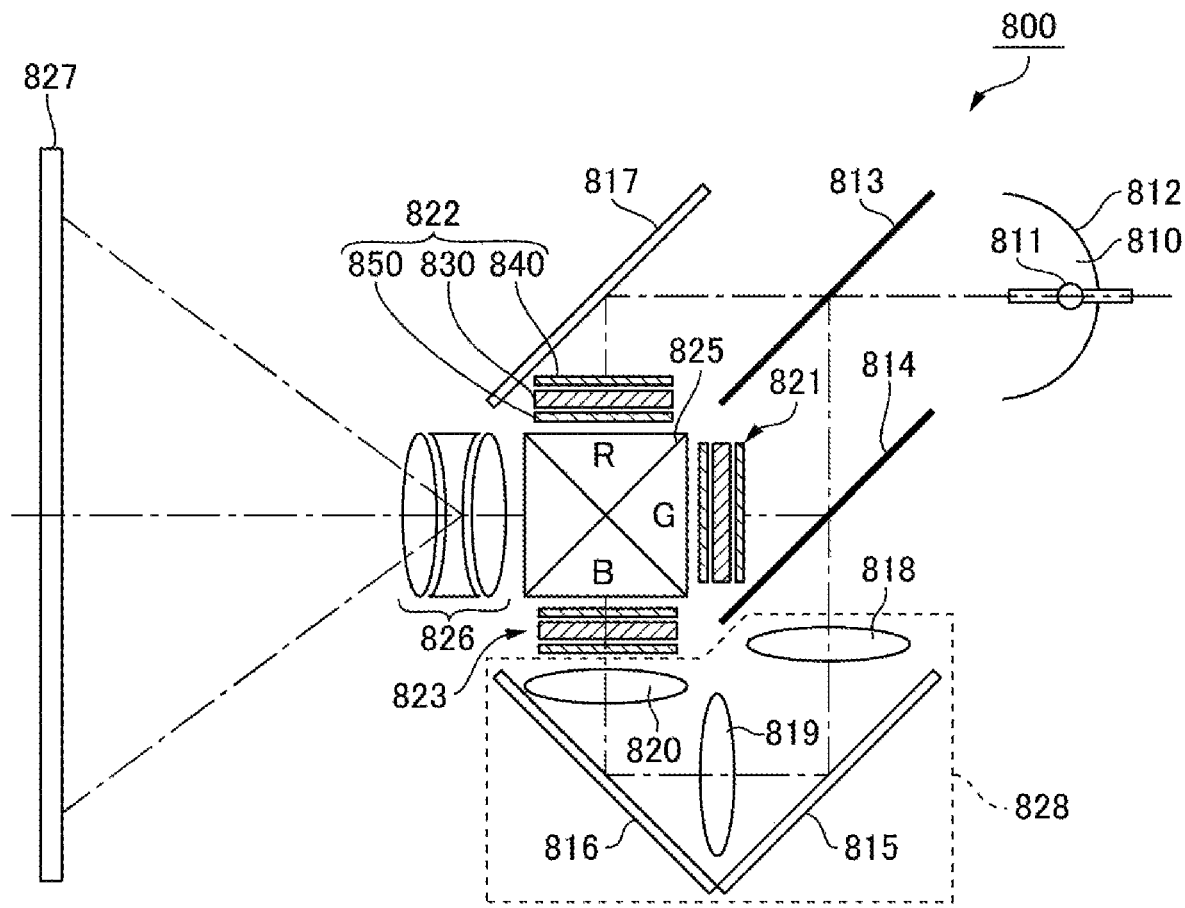

FIG. 10 is an explanatory view of a projection-type display apparatus using a transmission type liquid crystal light valve (electrooptical device).

DESCRIPTION OF EXEMPLARY EMBODIMENTS

An exemplary embodiment of the invention will be described below with reference to the drawings. Note that, in each of the figures to be referred to in the following description, to illustrate each layer, each member, and the like in a recognizable size in the drawings, each layer, each member, and the like are illustrated at a different scale. In the following description, a direction in which a wire grid 4 (wire-shaped metal layers 41) extends is referred to as a Y direction, and a direction in which the wire-shaped metal layers 41 are arranged in parallel is referred to as an X direction.

Configuration of Wire Grid Polarization Element 1

Figure 1:
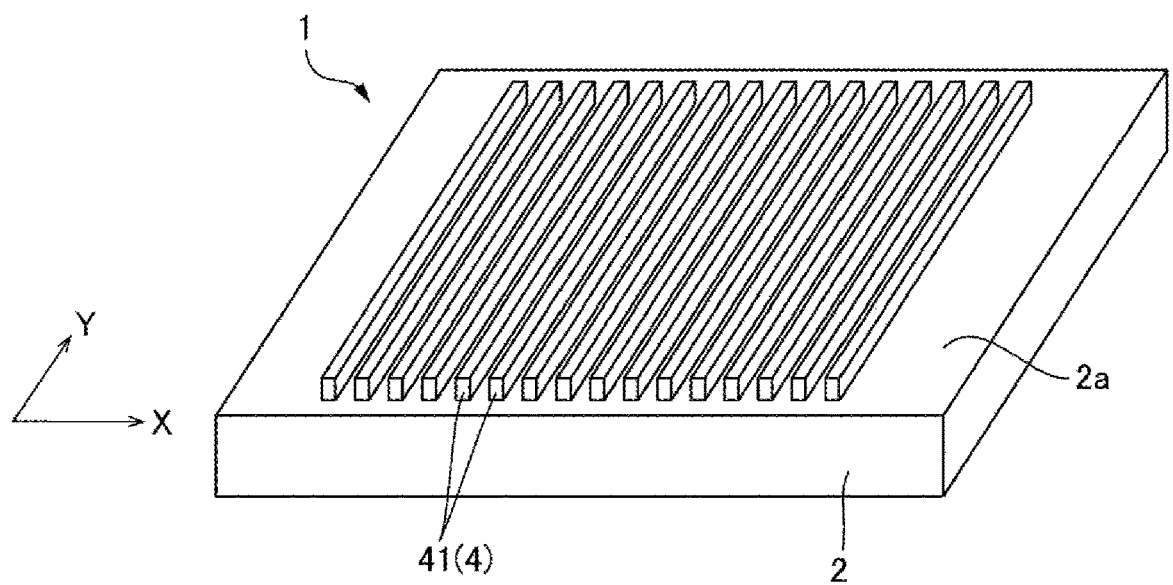
FIG. 1 is an explanatory view of a wire grid polarization element to which the invention is applied.

FIG. 1 is an explanatory view of a wire grid polarization element 1 to which the invention is applied. FIG. 2 is a cross-sectional view of the wire grid polarization element 1 illustrated in FIG. 1. The wire grid polarization element 1 illustrated in FIG. 1 and FIG. 2 includes a substrate 2 being transmissive, and the wire grid 4 made of metal and formed on one surface 2a of the substrate 2. The wire grid 4 includes a plurality of the wire-shaped metal layers 41 arranged in parallel at an equal pitch.

As the substrate 2, a transmissive substrate such as a glass substrate, a quartz substrate, a crystal substrate, and a plastic substrate is used. However, depending on applications of the wire grid polarization element 1, the wire grid polarization element 1 may accumulate heat and have a high temperature, and thus, highly thermal resistant glass or quartz is preferably used as a material of the substrate 2. The substrate 2 has, for example, a square shape having one side ranging from approximately 20 mm to 30 mm, and a thickness ranging from 0.5 mm to 0.8 mm. A width of each wire-shaped metal layer 41, and a space between the wire-shaped metal layers 41 (an interval between the wire-shaped metal layers 41) each are 400 nm or less, for example. In the exemplary embodiment, the width of the wire-shaped metal layer 41 and the space between the wire-shaped metal layers 41 each range from 20 nm to 300 nm, and a thickness of the wire-shaped metal layer 41 ranges from 150 nm to 400 nm, for example. The wire grid 4 (wire-shaped metal layers 41) is aluminum, silver, copper, platinum, gold, or an alloy containing these metals as a main component. In the exemplary embodiment, from a viewpoint of keeping an absorption loss in the wire grid 4 small in a visible light wavelength region, the wire grid 4 includes aluminum, an alloy containing aluminum as a main component, silver, or an alloy containing silver as a main component.

In the wire grid 4 constituted as described above, in a case where a pitch of the wire-shaped metal layers 41 is smaller enough than a wavelength of incident light, among the incident light, primary linearly polarized light (P wave, TM wave) vibrating in a direction perpendicular to an extending direction of the wire-shaped metal layers 41 is transmitted, and transmission of secondary linearly polarized light (S wave, TE wave) vibrating in the extending direction of the wire-shaped metal layers 41 is inhibited.

As illustrated in FIG. 2, in the wire grid polarization element 1 according to the exemplary embodiment, a light-absorbing layer 51 (not illustrated in FIG. 1) is formed in an end portion on an side opposite to the substrate 2 of the wire grid 4 (a tip of the wire-shaped metal layer 41). Accordingly, reflection at the wire-shaped metal layers 41 of light incident on the wire grid polarization element 1 from the opposite side to the substrate 2 can be suppressed by the light-absorbing layer 51.

Note that the one surface 2a of the substrate 2, an end face on the opposite side to the substrate 2 of the light-absorbing layer 51, a side surface of the wire-shaped metal layer 41, and a side surface of the light-absorbing layer 51 are covered with a protection layer 61 such as silicon oxide and hafnia.

Reflectance of Wire Grid Polarization Element 1

In the wire grid polarization element 1, in the exemplary embodiment, as will be described later in detail, in a case where the complex refraction index N of a material constituting the light-absorbing layer 51 is expressed by the following formula, the refractive index n and the extinction coefficient k are made appropriate and thus, a reflectance with respect to secondary linearly polarized light Rs is set to 3.0% or lower.

$$N = n + ik$$

n=refractive index
k=extinction coefficient

Additionally, in the exemplary embodiment, based on findings that the refractive index n and the extinction coefficient k change in association with an increase in an oxygen content and a nitrogen content in germanium, germanium appropriately containing at least one of oxygen and nitrogen is used as the light-absorbing layer 51 and thus, the refractive index n and the extinction coefficient k are made appropriate.

In the exemplary embodiment, in changing the oxygen content and the nitrogen content in germanium, at a manufacturing step of a wire grid polarization element, the light-absorbing layer 51 including a germanium film containing at least one of oxygen and nitrogen is provided on an side opposite to the substrate 2 with respect to the plurality of wire-shaped metal layers 41 by a reactive sputtering method in an atmosphere containing at least one of oxygen and nitrogen. More specifically, in performing the reactive sputtering method, an argon gas is introduced in a sputtering room, and an oxygen gas and a nitrogen gas are also introduced in the sputtering room. According to such a film forming method, it is possible to easily control the oxygen content and the nitrogen content in germanium.

The germanium film (light-absorbing layer 51) formed under such conditions is an oxygen-containing germanium film ($GeO_x$) in the case of introducing the oxygen gas in the sputtering room, and is a nitrogen-containing germanium film ($GeN_y$) in the case of introducing the nitrogen gas in the sputtering room. Each of the germanium films in these cases includes composition more germanium-rich than germanium dioxide ($GeO_2$) including stoichiometric composition of germanium and oxygen, and more germanium-rich than trigermanium tetranitride ($Ge_3O_4$) including stoichiometric composition of germanium and nitrogen. Accordingly, in the above-described germanium films ($GeO_x$), ($GeN_y$), x is greater than 0 (not including 0) and less than 2, and preferably, x ranges from 0.64 to 1.68. Additionally, y is greater than 0 (not including 0) and less than 4/3. Additionally, as flow rates in introducing the oxygen gas and the nitrogen gas to the sputtering room increase, values of x and y increase.

In the following description, the wire grid polarization element 1 in which the wire-shaped metal layer 41 is an aluminum layer having a thickness (height) of 240 nm and a width of 40 nm, a pitch between the wire-shaped metal layers 41 is 140 nm, and a thickness of the protection layer 61 is 3 nm will be described as a model case.

Note that in the wire grid polarization element 1 illustrated in FIG. 2, in a manufacturing step of the wire grid polarization element 1, an aluminum layer and a light-absorbing layer are formed in order and subsequently, the aluminum layer and the light-absorbing layer are patterned by anisotropic dry etching to form the wire-shaped metal layers 41 and the light-absorbing layer 51, and in this case, the one surface 2a of the substrate 2 is etched between the wire-shaped metal layers 41 to a depth of 70 nm. Since a metal material containing germanium as a main component is used as the light-absorbing layer 51 in the exemplary embodiment, patterning can be performed with an etching gas used in a normal semiconductor process.

Relation Between Complex Refraction Index and Polarization Characteristics

Each of FIGS. 3A to 3D is a graph showing a relation between a wavelength and polarization characteristics in a case where a complex refraction index of a material constituting the light-absorbing layer 51 illustrated in FIG. 2 is changed, and Tp, Ts, Rp, and Rs are added to solid lines indicating a transmittance of primary linearly polarized light (Tp), a transmittance of secondary linearly polarized light (Ts), a reflectance of primary linearly polarized light (Rp), and a reflectance of secondary linearly polarized light (Rs) in FIGS. 3A to 3D. Note that in FIGS. 3A, 3B, 3C, and 3D, there are shown simulation analysis results of polarization characteristics obtained in a case where the refractive index n and the extinction coefficient k of the material constituting the light-absorbing layer 51 are set to any of (n,k)=(4.9,2.0), (n,k)=(5,1), (n,k)=(4,1), and (n,k)=(3,1). In the simulation analysis, G-Solver, analysis software of Grating Solver Development was used. Additionally, in changing the refractive index n and the extinction coefficient k of the material constituting the light-absorbing layer 51, a film thickness of the light-absorbing layer 51 was set to a film thickness at which the reflectance Rs becomes the lowest.

Figure 3A:
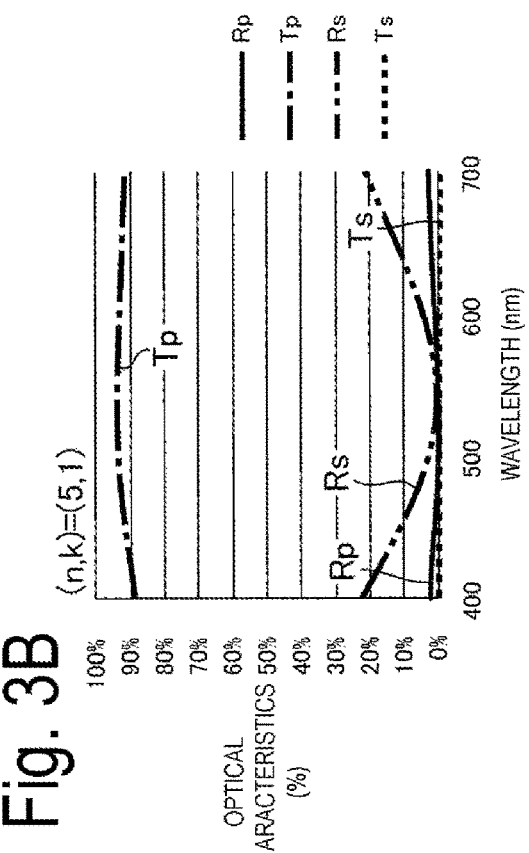

First, as illustrated in FIG. 3A, in a case where the light-absorbing layer 51 includes pure germanium, a physical property value defining a complex refraction index is ((n,k)=(4.9,2.0)) in a typical wavelength of 550 nm. Thus, in any wavelength within a visible region ranging from 400 nm to 700 nm, the reflectance of secondary linearly polarized light Rs is equal to or higher than 5.5%, and it is difficult to set the reflectance Rs to be equal to or lower than 3%. Note that under this condition, the film thickness of the light-absorbing layer 51 was set to 23 nm.

Figure 3B:
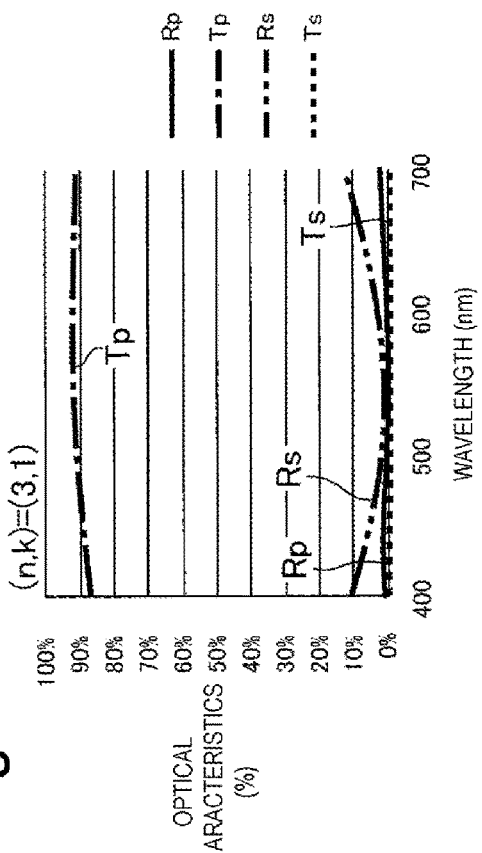
Figure 3C:
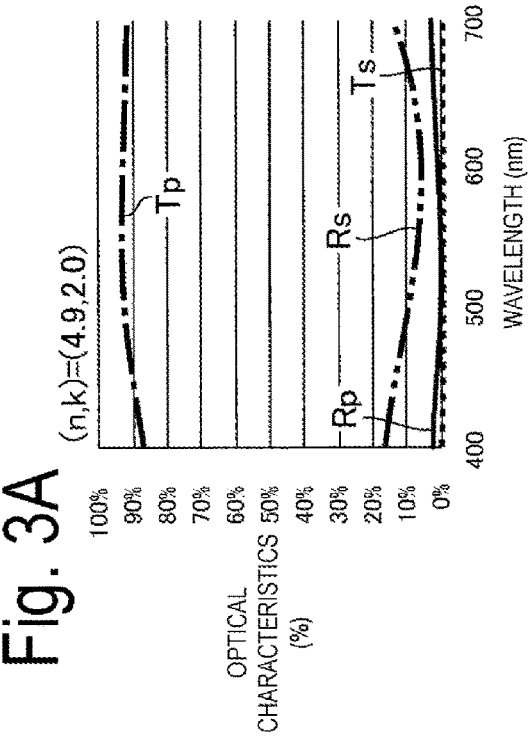
Figure 3D:
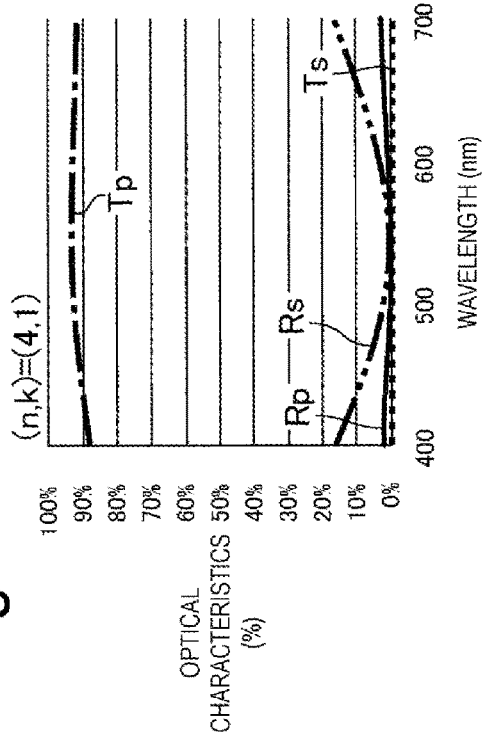

In contrast, as illustrated in FIGS. 3B, 3C, and 3D, it was able to be confirmed that in a case where the light-absorbing layer 51 includes a material having a complex refraction index satisfying the following conditions, the reflectance of secondary linearly polarized light Rs exhibits a minimum value in a vicinity of a wavelength of 550 nm, and the reflectance Rs can be set to a target value of 3% or lower. Additionally, it was possible to set the transmittance of primary linearly polarized light (Tp) to 93% or higher, and set the transmittance of secondary linearly polarized light (Ts) to 0.05% or lower.

Physical property value (n,k)=(5,1)
Physical property value (n,k)=(4,1)
Physical property value (n,k)=(3,1)

For example, in the case of the physical property value (n,k)=(5,1), an average of the reflectance Rs of a wavelength region ranging from 500 nm to 590 nm (green light) is 1.6%, and the film thickness of the light-absorbing layer 51 in this case is 22 nm. Similarly, in the case of the physical property value (n,k)=(4,1), an average of the reflectance Rs is 1.3%, and the film thickness of the light-absorbing layer 51 in this case is 33 nm. In the case of the physical property value (n,k)=(3,1), an average of the reflectance Rs is 1.3%, and the film thickness of the light-absorbing layer 51 in this case is 53 nm.

Relation Between Oxygen Gas Flow Rate and Complex Refraction Index

Each of FIGS. 4A and 4B is a graph showing a relation between a wavelength and a complex refraction index in a case where a condition (an oxygen gas flow rate) for film formation of a germanium film by a reactive sputtering method is changed, and a relation between a wavelength and the refractive index n at each oxygen gas flow rate and a relation between a wavelength and the extinction coefficient k at each oxygen gas flow rate are illustrated in FIGS. 4A and 4B, respectively. In FIGS. 4A and 4B, there are shown results obtained by measuring by an ellipsometer a physical property value (n,k) of a germanium film obtained in a case where in forming the germanium film to constitute the light-absorbing layer 51, as film forming conditions, a flow rate of an oxygen gas added to an argon gas of 40 sccm (standard cubic centimeter per minute) is changed to any of 0 sccm, 2 sccm, 5 sccm, and 10 sccm. Additionally, in FIGS. 4A and 4B, the results obtained in a case where the flow rate is 0 sccm is denoted by a solid line L0, the results obtained in a case where the flow rate is 2 sccm is denoted by a solid line L2, the results obtained in a case where the flow rate is 5 sccm is denoted by a solid line L5, and the results obtained in a case where the flow rate is 10 sccm is denoted by a solid line L10. Note that in performing the reactive sputtering method, conditions for an argon gas flow rate (40 sccm), a sputtering pressure (0.2 Pa), and a target size (120 mm) are constant regardless of the oxygen gas flow rate.

Additionally, FIG. 5 is a graph showing a relation between an oxygen gas flow rate in forming a germanium film and a complex refraction index of the germanium film with respect to light having a wavelength of 550 nm, and shows results obtained based on the results shown in FIGS. 4A and 4B. Note that in FIG. 5, the refractive index n is denoted by a black circle, and the extinction coefficient k is denoted by a white circle. As illustrated in FIGS. 4A, 4B, and 5, in a case where the oxygen gas flow rate is 0 sccm, a pure germanium film is formed, and a physical property value (n,k) of the pure germanium film is (4.9,2.0).

In contrast, as the oxygen gas flow rate increases from 2 sccm to 10 sccm, the refractive index n and the extinction coefficient k decrease. In a case where the oxygen gas flow rate was set to 10 sccm, a value (3.4,0.8) near the appropriate conditions of the physical property value (n,k) of (5,1), (4,1), and (3,1) was obtained. Additionally, in a case where the oxygen gas flow rate was set to 5 sccm, a value (4.1,1.6) near the appropriate conditions of the physical property value (n,k) of (5,1), (4,1), and (3,1) was obtained. Here, in the case where the oxygen gas flow rate was set to 10 sccm, a composition ratio of germanium and oxygen of the germanium film (GeO$_x$) was Ge:Ox=1:1.26 to 1.68. Additionally, in the case where the oxygen gas flow rate was set to 5 sccm, a composition ratio of germanium and oxygen of the germanium film (GeO$_x$) was Ge:Ox=1:0.64 to 0.96.

Relation Between Oxygen Gas Flow Rate and Reflectance Rs and the Like in Each Wavelength Region Thus, results obtained by investigating a relation between film forming conditions and a reflectance and the like in each wavelength are shown in FIGS. 6A and 6B. Each of FIGS. 6A and 6B is a graph showing a change in the reflectance Rs and the like in a case where the oxygen gas flow rate in film formation of a germanium film by a reactive sputtering method is changed, and in FIGS. 6A and 6B, a transmittance of primary linearly polarized light (Tp), a transmittance of secondary linearly polarized light (Ts), and a reflectance of secondary linearly polarized light (Rs) obtained in a case where the flow rate of the oxygen gas mixed with an argon gas is changed from 0 sccm to 10 sccm are denoted by solid lines Tp, Ts, and Rs, respectively. Note that in FIG. 6A, an average value in a wavelength region ranging from 500 nm to 590 nm is shown, and in FIG. 6B, an average value in a wavelength region ranging from 610 nm to 680 nm is shown. Additionally, in FIGS. 6A and 6B, a value in a case where the oxygen gas flow rate is any of 0 sccm, 2 sccm, 5 sccm, and 10 sccm is also shown as for the transmittance Tp and the reflectance Rs.

FIGS. 7A to 7C are graphs showing in comparison polarization characteristics of wire grid polarization elements 1 manufactured by changing and setting the oxygen gas flow rate, and FIGS. 7A, 7B, and 7C are graphs showing polarization characteristics of the wire grid polarization elements 1 manufactured by setting the oxygen gas flow rate to 0 sccm, 10 sccm, and 5 sccm, respectively.

As illustrated in FIG. 6A, in a wavelength region ranging from 500 nm to 590 nm (green light), in a case where the oxygen gas flow rate was 10 sccm, it was possible to reduce an average value of the reflectance Rs to 0.9%, and to achieve a target value of 3.0% or less. The polarization characteristics of the wire grid polarization element 1 manufactured under such conditions are as shown in FIG. 7B, and the reflectance Rs is reduced as compared with the polarization characteristics shown in FIG. 7A. Additionally, the transmittance Tp was 93%, the reflectance Rp was 0.2%, and a contrast ratio was 11900 under a condition in which the reflectance Rs exhibits a minimum value. Therefore, it is possible to sufficiently respond to a demand for a high-contrast supporting polarization plate of the wire grid polarization element 1 according to the exemplary embodiment.

In contrast, as illustrated in FIG. 6B, in the wavelength region ranging from 610 nm to 680 nm (red light), in the case where the oxygen gas flow rate is 10 sccm, an average value of the reflectance Rs is 2.3%. However, in a case where the oxygen gas flow rate is 5 sccm, an average value of the reflectance Rs is reduced to 0.9%, and it was possible to achieve a target value of 3.0% or less. The polarization characteristics of the wire grid polarization element 1 manufactured under such conditions are as shown in FIG. 7C, and the reflectance Rs is reduced as compared with the polarization characteristics shown in FIG. 7A. Additionally, the transmittance Tp was 92%, the reflectance Rp was 1.3%, and the contrast ratio was 24500 under a condition in which the reflectance Rs exhibits a minimum value. Therefore, it is possible to sufficiently respond to a demand for a high-contrast supporting polarization plate of the wire grid polarization element 1 according to the exemplary embodiment.

As described above, since an optimum oxygen gas flow rate varies depending on a wavelength region incident on the wire grid polarization element 1, it is preferable that the oxygen gas flow rate be set to an optimum flow rate according to a wavelength region incident on the wire grid polarization element 1, and that an oxygen content in germanium constituting the light-absorbing layer 51 be set to an optimum amount. More specifically, it is preferable that the oxygen content in germanium constituting the light-absorbing layer 51 of the wire grid polarization element 1 on which the first light beam of the first wavelength region (for example, green light having a wavelength region ranging from 500 nm to 590 nm) is incident be larger than the oxygen content in germanium constituting the light-absorbing layer 51 of the wire grid polarization element 1 on which the second light beam having a longer wavelength than the first wavelength region (for example, red light having a wavelength region ranging from 610 nm to 680 nm) is incident.

Relation Between Nitrogen Gas Flow Rate and Reflectance Rs and the Like in Each Wavelength Region In the above-described exemplary embodiment, in forming the germanium film by the reactive sputtering method, the oxygen gas was introduced, but as will be described with reference to FIGS. 8A, 8B, and 9, it is also possible to obtain similar results in the case of introducing a nitrogen gas. Each of FIGS. 8A and 8B is a graph showing a relation between a wavelength and a complex refraction index in a case where a condition (a nitrogen gas flow rate) for film formation of a germanium film by a reactive sputtering method is changed, and a relation between a wavelength and the refractive index n at each nitrogen gas flow rate and a relation between a wavelength and the extinction coefficient k at each nitrogen gas flow rate are shown in FIGS. 8A and 8B. In FIGS. 8A and 8B, there are shown results obtained by measuring by an ellipsometer a physical property value (n,k) of a germanium film obtained in a case where in forming the germanium film to constitute the light-absorbing layer 51, as film forming conditions, a flow rate of a nitrogen gas added to an argon gas of 40 sccm is changed to any of 0 sccm, 2 sccm, 5 sccm and 10 sccm. Additionally, in FIGS. 8A and 8B, the results obtained in a case where the flow rate is 0 sccm is denoted by a solid line L0, the results obtained in a case where the flow rate is 2 sccm is denoted by a solid line L2, the results obtained in a case where the flow rate is 5 sccm is denoted by a solid line L5, and the results obtained in a case where the flow rate is 10 sccm is denoted by a solid line L10.

FIG. 9 is a graph showing a relation between a nitrogen gas flow rate in forming a germanium film and a complex refraction index of the germanium film with respect to light having a wavelength of 550 nm, and shows results obtained based on the results illustrated in FIGS. 8A and 8B. Note that in FIG. 9, the refractive index n is denoted by a black circle, and the extinction coefficient k is denoted by a white circle.

As illustrated in FIGS. 8A, 8B and 9, as the nitrogen gas flow rate increases from 2 sccm to 10 sccm, the refractive index n and the extinction coefficient k decrease. Additionally, a relation between the nitrogen gas flow rate and a physical property value (the refractive index n and the extinction coefficient k) is substantially similar to in the case of changing the oxygen gas flow rate, and it is possible to obtain a similar effect to the above-described effect obtained in the case of introducing the oxygen gas.

Configuration Example 1 of Projection-Type Display Apparatus

A projection-type display apparatus as an example of an electronic device using the wire grid polarization element 1 according to the exemplary embodiment described above will be described. FIG. 10 is an explanatory view of a projection-type display apparatus using a transmission type liquid crystal light valve (electrooptical device). A projection-type display apparatus 800 illustrated in FIG. 10 includes a light source unit 810, dichroic mirrors 813, 814, reflecting mirrors 815, 816, 817, an incident lens 818, a relay lens 819, an emitting lens 820, optical modulation units (a first optical modulation unit 821, a second optical modulation unit 822, and a third optical modulation unit 823), a cross dichroic prism 825, and a projecting lens 826 (projection optical system).

The light source unit 810 includes a lamp 811 such as a metal halide lamp, and a reflector 812 configured to reflect light of the lamp. Note that, for the light source unit 810, in addition to the metal halide lamp, a super high-pressure mercury lamp, a flash mercury lamp, a high-pressure mercury lamp, a Deep UV lamp, a xenon lamp, a xenon flash lamp, and the like are also usable. Additionally, for the light source unit 810, a solid light source such as a laser element and a light emitting diode may be used.

The dichroic mirror 813 transmits red light incorporated in white light from the light source unit 810, and also reflects blue light and green light. The transmitted red light is reflected by the reflecting mirror 817, and is incident on the second optical modulation unit 822 for red light. Additionally, of the blue light and the green light reflected by the dichroic mirror 813, the green light is reflected by the dichroic mirror 814, and is incident on the first optical modulation unit 821 for green light. The blue light is transmitted by the dichroic mirror 814 and is incident on the third optical modulation unit 823 for blue light, via a relay optical system 828 including the incident lens 818, the relay lens 819, and the emitting lens 820, and provided to prevent an optical loss due to a long optical path.

In each of the first optical modulation unit 821, the second optical modulation unit 822, and the third optical modulation unit 823, an incident side polarization element 840 and an emitting side polarization element 850 are disposed on both sides sandwiching a liquid crystal light valve 830 as the electrooptical device, respectively. The incident side polarization element 840 is provided between the light source unit 810 and the liquid crystal light valve 830 on an optical path of light emitted from the light source unit 810. The emitting side polarization element 850 is provided between the liquid crystal light valve 830 and the projecting lens 826 on an optical path of light passing through the liquid crystal light valve 830. The incident side polarization element 840 and the emitting side polarization element 850 are disposed to have transmission axes perpendicular to each other.

The incident side polarization element 840 is a reflective polarization element, and reflects light having a vibration direction perpendicular to the transmission axis. The emitting side polarization element 850 is an absorptive polarization element using the wire grid polarization element 1 to which the invention is applied.

Light of three colors modulated respectively by the first optical modulation unit 821, the second optical modulation unit 822, and the third optical modulation unit 823 is incident on the cross dichroic prism 825. This cross dichroic prism 825 is obtained by bonding four right-angle prisms, and a dielectric multilayer film configured to reflect red light and a dielectric multilayer film configured to reflect blue light are formed as an X shape on interfaces of the prisms. These dielectric multilayer films synthesize the light of the three colors to form light expressing a color image. The synthesized light is projected on a screen 827 by the projecting lens 826 being the projection optical system, and the image is expanded and displayed.

In the exemplary embodiment, since the wire grid polarization element 1 to which the invention is applied is used for the emitting side polarization element 850 in each of the first optical modulation unit 821, the second optical modulation unit 822, and the third optical modulation unit 823, a situation in which light reflected by the emitting side polarization element 850 is incident on the liquid crystal light valve 830 is unlikely to occur.

Another Configuration Example 1 of Projection-Type Display Apparatus

In the above-described exemplary embodiment, although in each of the first optical modulation unit 821, the second optical modulation unit 822, and the third optical modulation unit 823, the wire grid polarization element 1 to which the invention is applied is used for the emitting side polarization element 850, the wire grid polarization element 1 to which the invention is applied may be used for the emitting side polarization elements 850 in each of the first optical modulation unit 821 corresponding to green light (the first light beam of the first wavelength region) and the second optical modulation unit 822 corresponding to red light (the second light beam of the second wavelength region), and a wire grid polarization element other than the wire grid polarization element 1 to which the invention is applied may be used for the emitting side polarization element 850 in the third optical modulation unit 823 corresponding to blue light (a third light beam of a third wavelength region). The reason is that as for the emitting side polarization element 850 in the third optical modulation unit 823 corresponding to the blue light, a wire grid polarization element having a low reflectance Rs can be constituted without applying the invention, but by appropriately selecting a material of the light-absorbing layer 51.

Another Configuration Example 2 of Projection-Type Display Apparatus

In the exemplary embodiment, in the case where the wire grid polarization element 1 to which the invention is applied is used at least in each of the first optical modulation unit 821 and the second optical modulation unit 822, for the reason described with reference to FIGS. 6A and 6B and FIGS. 7A to 7C, it is preferable to increase an oxygen gas flow rate in the wire grid polarization element 1 (first wire grid polarization element) used in the first optical modulation unit 821 as compared to an oxygen gas flow rate in the wire grid polarization element 1 (second wire grid polarization element) used in the second optical modulation unit 822 and to increase an oxygen content or a nitrogen content in germanium constituting the light-absorbing layer 51. According to such a configuration, in any of the wire grid polarization element 1 (first wire grid polarization element) used in the first optical modulation unit 821 and the wire grid polarization element 1 (second wire grid polarization element) used in the second optical modulation unit 822, it is possible to set the reflectance Rs to 3.0% or lower.

Other Projection-Type Display Apparatuses

Note that the projection-type display apparatus may include a configuration in which an LED light source or the like configured to emit light of each color is used as a light source unit and the light of each color emitted from the LED light source is supplied to another liquid-crystal device. Additionally, the wire grid polarization element 1 to which the invention is applied may be used, not only in the above-described projection-type display apparatus 800, but also in the case of constituting an optical modulation unit in an electronic device such as a head mount display, a personal computer, a liquid crystal television, and a car navigation device.

The entire disclosure of Japanese Patent Application No. 2017-248836, filed Dec. 26, 2017 is expressly incorporated by reference herein.

What is claimed is:

1. A wire grid polarization element comprising:

a substrate;

a plurality of wire-shaped metal layers arranged in parallel on one surface of the substrate;

a light-absorbing layer comprising a composition more germanium-rich than germanium dioxide or a composition more germanium-rich than trigermanium tetranitride is provided on a side opposite to the substrate with respect to the plurality of wire-shaped metal layers; and a protection layer that contacts at least one side of the light-absorbing layer and the one surface of the substrate.

2. The wire grid polarization element according to claim 1, wherein the wire grid polarization element has a reflectance equal to or lower than 3.0% with respect to linearly polarized light vibrating in an extending direction of the plurality of wire-shaped metal layers.

3. The wire grid polarization element according to claim 1, wherein
the light-absorbing layer comprises the composition more germanium-rich than germanium dioxide including stoichiometric composition of germanium and oxygen, and more germanium-rich than trigermanium tetranitride including stoichiometric composition of germanium and nitrogen.

4. The wire grid polarization element according to claim 1, wherein
the light-absorbing layer comprises germanium oxide containing germanium and oxygen, and a composition ratio of the germanium and the oxygen is 1:0.64 to 1.68.

5. An electronic device comprising:
a first optical modulation unit comprising a first wire grid polarization element comprising:
  a substrate;
  a plurality of wire-shaped metal layers arranged in parallel on one surface of the substrate; and
  an electrooptical device,
  the first wire grid polarization element configured to receive a first light beam of a first wavelength region; and
a second optical modulation unit comprising a second wire grid polarization element comprising:
  a substrate;
  a plurality of wire-shaped metal layers arranged in parallel on one surface of the substrate; and
  an electrooptical device,
  the second wire grid polarization element configured to receive a second light beam of a wavelength longer than the first wavelength region, wherein
each of the first wire grid polarization element and the second wire grid polarization element comprises:
  a light-absorbing layer comprising:
    a composition more germanium-rich than germanium dioxide or a composition more germanium-rich than trigermanium tetranitride is provided on a side opposite to the substrate with respect to the plurality of wire-shaped metal layers; and
  a protection layer that contacts at least one side of the light-absorbing layer and the one surface of the substrate.

6. The electronic device according to claim 5, wherein
an oxygen content and a nitrogen content in the light-absorbing layer of the first wire grid polarization element are larger than an oxygen content and a nitrogen content in the light-absorbing layer of the second wire grid polarization element.

7. The electronic device according to claim 5, wherein
the first wire grid polarization element has a reflectance equal to or lower than 3.0% with respect to linearly polarized light of the first light beam vibrating in an extending direction of the plurality of wire-shaped metal layers, and
the second wire grid polarization element has a reflectance equal to or lower than 3.0% with respect to linearly polarized light of the second light beam vibrating in an extending direction of the plurality of wire-shaped metal layers.

8. The electronic device according to claim 5, wherein
the first light beam is green light, and
the second light beam is red light.

* * * * *